Leonard Packard,
4474 *Cultivator.* REISSUED JUL 18 1871
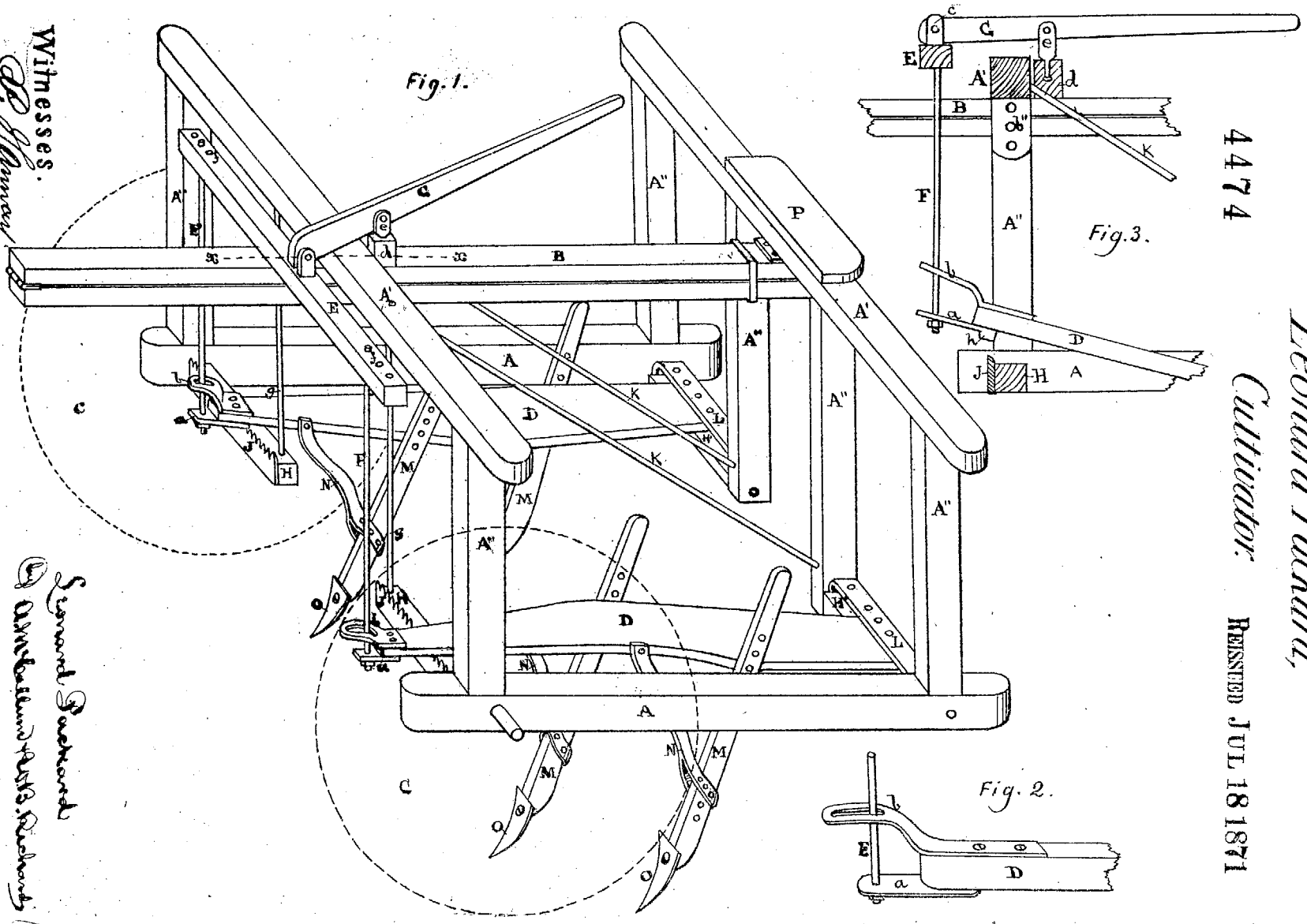
Witnesses.
P. H. Conway
Thos. C. Fridlen
Leonard Packard
by A. M. Ballard & W. B. Richards
Attys

UNITED STATES PATENT OFFICE.

LEONARD PACKARD, OF GALESBURG, ILLINOIS.

IMPROVEMENT IN CULTIVATORS.

Specification forming part of Letters Patent No. 25,037, dated August 9, 1859; reissue No. 4,474, dated July 18, 1871.

*To all whom it may concern:*

Be it known that I, LEONARD PACKARD, of Galesburg, Knox county, in the State of Illinois, have invented certain Improvements in Cultivators, of which the following is a specification:

My invention relates to improvements in that class of wheeled implements known as straddle-row cultivators, from the fact that the machine passes over the row of plants being cultivated, a clear space being left between the gangs of plows for the passage of the row. The invention consists: 1st, in a new and improved device for raising and lowering the plow-beams and moving them laterally so as to clear obstacles in the line of progression and avoid plowing out such plants as may have germinated slightly out of the line of the row. 2d, it consists in a new and improved method of attaching the standard or share-stocks to the plow-beams so that they may be adjusted on the beams and the plows be made to run more or less deep, as desired.

In the accompanying drawing, Figure 1 is a perspective view of my improved cultivator. Fig. 2 is a separate view of the forward end of one of the plow-beams. Fig. 3 is a sectional view taken on the plane of the line *x x*, Fig. 1.

A A′ A″ represent the main frame of the machine, composed of two longitudinal parallel bars, A A, and two elevated cross-bars, A′ A′, united by uprights A″, two in front and four in rear. B is the draft-pole. Its rear end is hinged to the rear cross-bar A′, and it is adjustably secured between two perforated plates, *b″*, secured to the under side of the forward cross-bar by a bolt. By this arrangement the pole may be raised or lowered to suit the team. *c c* represent two wheels, on which the frame is supported by means of short axles secured to the bars A A. D D represent the plow-beams. To the front end of each beam I secure two plates, *a* and *b*, as shown in Figs. 1 and 2. The upper plate *b* is provided with a longitudinal slot, as shown in the drawing, wide enough to receive the rod F, and the lower plate *a* is provided with a hole, also of suitable size to receive the rod F. E is a cross-bar to which the upper ends of the vertical rods F F are adjustably secured. These rods pass through the slots in the plates *b*, and their lower ends are secured beneath the plates *a*. C is a lever, the forward end of which is pivoted between two plates, *e e*, secured to center of bar E. *d* is a post secured to draft-pole immediately in rear of the forward cross-bar A. The lever C is pivoted between two plates, *e*, secured by a swivel in the post *d*, forming the fulcrum of the lever. A series of holes, *f*, is made in the ends of the bar E for adjusting the width of the space between the forward ends of the plow-beams. H H are two short bars secured to the forward ends of the bars A and extending laterally toward the center of the machine. Their inner ends are connected with the forward cross-bar A′ by brace-rods *g g*. The front sides of these bars H are provided with serrated plates J, and catches or projections *h h* are secured to the under sides of the plow-beams near their forward ends. H′ H′ are short cross-bars pivoted by journals *h* between the lower ends of the rear uprights A″. The frame is further braced by rods K passing from the forward cross-bar A′ to the lower ends of the inner rear uprights A″. L L are perforated plates secured to the cross-bars H′ between the rear uprights. To these the rear ends of the plow-beams are adjustably pivoted. M M M M represent the standard or plow-stock, one on each side of each plow-beam. They are provided with a series of bolt-holes near their upper ends, so that they may be adjusted on the beams and the plows thereby be made to run more or less deep, as desired. They are also provided with a corresponding series of holes near their lower ends for the purpose of similar adjustment with the braces N, which pass upward and forward to the plow-beam, to which they are secured. The lower ends of these braces N are also perforated with a series of holes by means of which the standards may be set at any inclination desired. O O O O are the shovels or blades secured to the standards in a diagonal position, left and right, so that by changing them they may be made to throw the soil to or from the row of plants being cultivated. P is the driver's seat, secured to the center of the rear cross-bar A′.

In a machine thus constructed it will be perceived that the tongue, central portion of the frame, and driver's seat are all elevated sufficiently high to pass over the row of plants to be cultivated, even at an advanced stage of their growth, without injury thereto, and in operating the machine the horses are driven one on each side of the row, the draft-pole or tongue being kept directly over and in a line with the row, while the gangs of plows are arranged on each side of it so that the machine straddles the row. From his elevated seat the driver can easily observe what is before the machine, and should he come to any obstruction or obstacle in the way he presses down the lever G and thereby raises the plows so as to clear such obstruction, and should there be any irregular plants or sinuosities in the row by pressing the lever to the right or left the plows are made to move to one side so as to avoid plowing out such irregular plants, and this without altering the direct course of the machine along the row. When it is unnecessary to thus raise or lower the plows or move them laterally they are retained steadily in the required position by the plates *h* engaging with the teeth of the serrated plates J secured to the front sides of the bars H H. When it is desired to increase or lessen the distance between the plow-beams, it is accomplished by moving the rods F to or from the center of the bar E, and the rear ends of the plow-beams on the perforated bars L. When it is desired to alter the depth of penetration of the plows, it is accomplished by moving the standards M up or down on the plow-beams and braces N; and when it is desired to alter the inclination or pitch of the plows, the standards are moved diagonally to a higher or lower hole in the braces N.

What I claim as my invention is—

1. The plates *a* and longitudinally-slotted plates *b*, secured to the forward ends of the beams D, and pivoted by rods F to the bar E so as to permit of the plows being moved in a vertical or lateral direction by lever G, as and for the purposes set forth.

2. The interchangeable standards M, adjustably secured to the beams D and braces N, for the purposes set forth.

3. The combination of the pivoted beams D and adjustable standards M with plates *a b*, and rods F, bar E, and lever G, substantially as and for the purpose set forth.

Witnesses: LEONARD PACKARD.
J. B. TALBOT,
A. M. COMSTOCK.